April 6, 1937. L. J. PAGE Re. 20,322

TYPE OF EYEGLASS AND SPECTACLE MOUNTING OR BRIDGE

Original Filed June 26, 1931

Inventor
Louis John Page

By Geo. P. Kimmel
Attorney

Reissued Apr. 6, 1937 Re. 20,322

UNITED STATES PATENT OFFICE 20,322

TYPE OF EYEGLASS AND SPECTACLE MOUNTING OR BRIDGE

Louis John Page, Brooklyn, N. Y., assignor to George P. Kimmel, Brookeville, Md.

Original No. 1,946,233, dated February 6, 1934, Serial No. 547,037, June 26, 1931. Application for reissue February 5, 1936, Serial No. 62,552

14 Claims. (Cl. 88—49)

The adjustable bifocal mounting is an eyeglass bridge which permits the wearer of bifocal lenses to raise and lower the glasses so that the reading section of the lenses may be raised to a level with the eye and lowered when not in use.

The adjustable bifocal mounting is a bridge which may be fitted to rims holding lenses or to straps which fit directly to the lenses.

The mounting consists of two parts—the outer part which is fitted to the rims or lenses is rigid and grooved to hold the inner part. The inner part which is fitted with nose pads moves up and down in grooves of the outer part.

Figure 1:
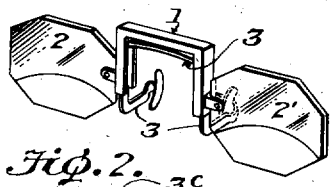
Figure 1 is a perspective view of a pair of eye glasses equipped with the adjustable bifocal mounting, with the lenses adjusted for distant vision.
Figure 4:
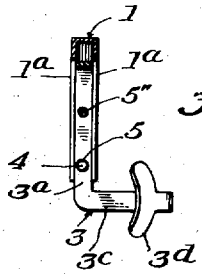
Figure 4 is a view through the section 4—4 of Figure 3 and shows the inner nose piece locked on the prongs.
Figure 2:
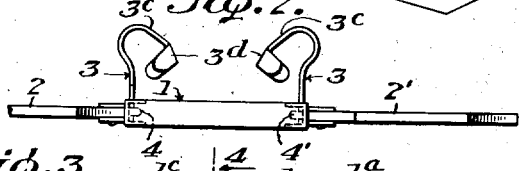
Figure 2 is a top view of the device shown in Figure 1.
Figure 3:
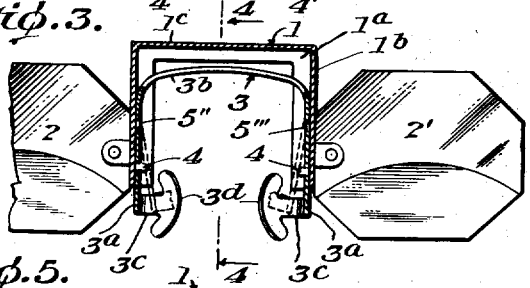
Figure 3 is a view from the back as opposed to the front view shown in Figure 1, with the bridge connecting the two lenses shown in section, and the adjustable auxiliary nose piece shown in full, locked in position for far vision and dotted as compressed to release from the prongs.
Figure 5:
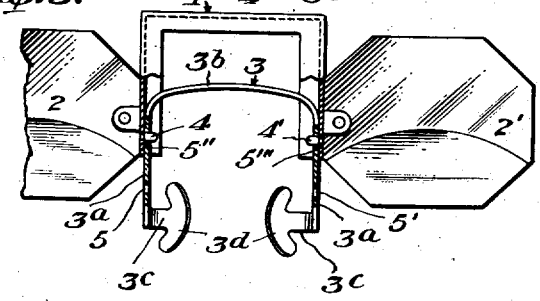
Figure 5 is identical with Figure 3, except that the auxiliary bridge is shown in position to allow use of the lower portion of the bifocal lenses.

With reference to the drawing, a high or upper bridge piece or outer structure is indicated at 1 and it is of inverted yoke-shape in contour. The structure 1 is formed on its inner face with an inwardly opening groove or channel $1^a$ extending from one end to the other end thereof and which has its ends opening at the ends of the structure. The structure 1 includes vertical sides or members $1^b$ and a horizontal top or arch $1^c$ from the ends of which depend said sides. The sides of structure 1 are secured with the nasal sides of the lenses 2, 2' for coupling them together, as well as maintaining them in spaced relation. The structure 1 may be generally referred to as a lens carrying assembly. Arranged below the structure 1 is an auxiliary bridge, nose piece or inner structure 3 of inverted yoke-shape contour. The structure 3 which may be generally referred to as a supporting assembly, includes vertical sides or members $3^a$ and a horizontal top or arch $3^b$. Preferably the structure 1 is formed of non-resilient material. The structure 3 is formed of a strap of resilient material and is to rest on the nose of the wearer. The structures 1 and 3 are shiftable relative to each other and when shifted the structure 3 slides vertically within the groove or channel $1^a$ of structure 1. The sides $3^a$ of the structure 3 are formed with spaced perforations 5, 5', 5'' and 5''' disposed in a manner to be selectively engaged by the pins 4, 4' on the sides $1^b$ of the structure 1 thereby latching the lenses in the position to which they have been adjusted, that is to say, vertically with respect to the structure 3. The lower ends of the sides $3^a$ of the structure 3 are formed with lateral arms $3^c$ for suspending the nose pads $3^d$. The nose pads $3^d$ are offset rearwardly with respect to the plane of the lenses and are adapted to bear on opposite sides of the nose of the wearer. No springs or screws are used in this apparatus, the relative positions of the two members being fixed by the prongs and perforations and the resilient nature of the inner structure. While the bridge 1 may be made of resilient material, the construction for successful operation requires that the bridge 1 should be substantially rigid, so as not to change shape under the pressure of the resilient auxiliary nose piece or bridge 3.

While this particular illustration shows eye glasses and a particular form of nose pads, I do not limit myself to this application as this same principle may be applied to spectacles wherein the nose pads merely rest on the nose and do not grip it firmly. I do not limit myself to the particular design of upper bridge shown, as this may be made much less conspicuous and of different shape, but still permit operation in accordance with the principles set down. For further convenience, the auxiliary bridge having both of its sides equipped with nose pads may also be provided on said sides with projecting ears so as to permit easier manipulation of the auxiliary bridge by contracting the said sides by pressure on such ears.

I am aware that prior to my invention eyeglass and spectacle bridges or mountings have had pads which rest on the sides of the bridge of the nose, that the lenses were held in place by a bar arching the nose and apparently of the same appearance as the adjustable bifocal mounting,—but I do claim:

1. In a nose-piece structure for spectacles, eye-glasses, and the like, a bridge having substantially vertical members, said vertical members being provided with grooves and being fitted with two prongs on either side of the said vertical members, an auxiliary nose piece provided with several sets of holes placed to engage the prongs in said bridge and arranged to slide within the grooves of said bridge, maintaining contact therewith by virtue of the resilient properties of the auxiliary nose-piece structure.

2. In a nose piece structure for spectacles, eyeglasses, and the like, a high bridge fitted to the lenses having substantially vertical members, said vertical members being provided with grooves and a pair of prongs, one prong being located on the inner side of each vertical member, a resilient auxiliary nose piece for remaining stationary on the nose and provided with openings disposed for selective engagement by said prongs, said auxiliary nose piece arranged to slide within the grooves of said bridge and maintaining frictional binding contact with said members by virtue of its resilient properties.

3. In a nose piece structure for spectacles, eyeglasses, and the like, a high bridge of non-resilient material fitted to the lenses and having substantially vertical members provided with prongs on the inner sides thereof, an auxiliary nose piece of resilient material extending into said bridge and provided with nose pads for maintaining its position on the nose, said auxiliary nose piece being provided with spaced openings disposed to selectively receive said prongs.

4. In a nose piece structure for spectacles, eyeglasses, and the like, a high bridge of non-resilient material fitted to the lenses and having substantially vertical members provided with grooves and a prong on the inner side of each thereof, an auxiliary nose piece of resilient material provided with nose pads for maintaining its position on the nose, said auxiliary nose piece provided with spaced openings disposed to selectively receive said prongs, said auxiliary nose piece arranged to slide within the grooves of said bridge and for maintaining contact with said members by virtue of its resilient properties.

5. In a nose piece structure for spectacles, eyeglasses, and the like, a high bridge of non-resilient material fitted to the lenses and including substantially vertical members, said members being grooved on their inner sides and each provided with a prong in its groove, an auxiliary nose piece of resilient material provided with nose pads for maintaining its position on the nose, said auxiliary nose piece provided with spaced openings disposed to selectively receive said prongs, said auxiliary nose piece arranged to slide within the said grooves and for maintaining the prongs in selected openings by virtue of its resilient properties thereof locking the bridge in adjusted position relative to the nose piece.

6. In a nose-piece structure for spectacles, eyeglasses, and the like, a bridge having two substantially vertical members, said members each being provided with a groove and being fitted with a portion of a latching device, an auxiliary nose piece provided with the remaining portions of said latching device and placed so as to engage the portions fitted to said bridge, and said nose piece also being arranged to slide within the grooves of said bridge, maintaining contact therewith by virtue of the resilient properties of the auxiliary nose-piece structure.

7. In a nose-piece structure for spectacles, eyeglasses and the like, a high bridge of non-resilient material fitted to the lenses, having two substantially vertical members, said members each being provided with a groove and being fitted with a portion of a latching device, an auxiliary nose piece of resilient material fitted with nose pads maintaining their position on the nose, said nose piece being provided with the remaining portions of said latching device and placed so as to engage the portions fitted to said bridge, and said nose piece being arranged to slide within the grooves of said bridge maintaining contact therewith, and the portions of the latching device on the nose piece together with the portions of the latching device on the bridge operating to lock the position by virtue of the resilient properties of said auxiliary nose-piece structure.

8. In an ophthalmic mounting, a main bridge member including an arch and a pair of sides adapted to be connected to the nasal sides of a pair of lenses for coupling them together and for bodily adjusting them relative to the eyes, an auxiliary bridge member including an arch and a pair of sides, said auxiliary bridge member being provided with nose pads to rest on the nose of the wearer, said bridge members arranged one within the other and one being slidable relative to the other for adjusting the position of the lenses, and said auxiliary bridge member being resilient to provide for the said sides thereof frictionally binding against the inner faces of the sides of the other bridge member.

9. In an ophthalmic mounting, a main bridge member including an arch, a pair of sides adapted to be connected to the nasal sides of a pair of lenses for coupling them together and for bodily adjusting them relative to the eyes, an auxiliary bridge member including an arch and a pair of sides, said auxiliary bridge member being provided with nose pads to rest on the nose of the wearer, said bridge member arranged in sliding relation to each other for adjusting the position of the lenses, said auxiliary bridge member being resilient to provide for the said sides thereof frictionally binding against the faces of the sides of the other bridge member, and means carried by the auxiliary bridge to facilitate the shifting thereof with respect to the other bridge.

10. In an ophthalmic mounting, a main bridge member including an arch and a pair of sides adapted to be connected to the nasal sides of a pair of lenses for coupling them together and for bodily adjusting them relative to the eyes, an auxiliary bridge member including an arch and a pair of sides, said auxiliary bridge member being provided with nose pads to rest on the nose of the wearer, said bridge members arranged one within the other and one being slidable relative to the other for adjusting the position of the lenses, said auxiliary bridge member being resilient to provide for the said sides thereof frictionally binding against the inner faces of the sides of the other bridge member, and the sides of said members having coacting interengaging releasable means for latching the lenses in adjusted position, said means being held in engaged position by the resilient characteristic of the auxiliary bridge.

11. In spectacles, eyeglasses, and the like, normally having lenses, a bridge for connecting said lenses and maintaining them in spaced relation, having an arch portion for spanning and normally spaced from the bridge of the nose of the wearer, guideways secured adjacent the nasal side portions of the lenses, and a supporting bridge structure for said spectacles or eyeglasses, said supporting bridge having a pair of legs and an arch portion joining them, said legs mounted in said guideways and frictionally binding thereagainst whereby said lenses may be maintained in vertical adjustment, rearwardly extending nose pad arms integral with said legs and nose pads on said arms, said arch portions of said bridges so correlated that respectively downward and upward pressure on said connecting bridge towards or away from said supporting bridge will shift said lenses in a vertical plane before the eyes of the wearer.

12. In an ophthalmic mounting for bifocal lenses a supporting assembly stationary when said mounting is worn and a lens carrying assembly vertically adjustable on and with respect to said supporting assembly when said mounting is worn, said supporting assembly including a pair of legs and an arch portion joining them, said legs having rearwardly extending nose pad carrying arms and nose pads on said arms for bearing against opposite sides of the nose, said lens carrying assembly including a lens-connecting and nose arching portion and means secured adjacent the nasal portions of said lenses, coacting with said legs in frictionally binding engagement for maintaining said lens carrying assembly in vertically adjusted position, said last named nose arching portion spaced from the bridge of the nose of the wearer and coacting with said first named arch portion to provide a means permitting shifting said lenses before the eyes when the mounting is worn.

13. In an ophthalmic mounting, a vertically adjustable lens carrying assembly having an arch for connecting said lenses in spaced relation, bodily movable on and with respect to a supporting assembly; said supporting assembly comprising a pair of resilient leg elements, an arch joining said leg elements, angularly disposed nose pad arms integral with said leg elements, and means secured adjacent the nasal sides of said lenses for frictional binding engagement with said leg elements for maintaining said lens carrying assembly in a position of vertical adjustment.

14. In vertically adjustable bifocal spectacles, guideways secured adjacent the nasal sides of and an arch connecting the lenses of the spectacles spaced from the nose of the wearer when the spectacles are worn, legs of resilient material within and frictionally engaging with the side of said guideways, and a connecting arch for joining said legs, nose pad arms on and extending rearwardly from said legs at an angle to the latter, and nose pads on said arms rearwardly offset with respect to the plane of the lenses.

LOUIS J. PAGE.